United States Patent
Swaminathan et al.

(10) Patent No.: US 10,460,247 B2
(45) Date of Patent: Oct. 29, 2019

(54) ATTRIBUTE WEIGHTING FOR MEDIA CONTENT-BASED RECOMMENDATION

(71) Applicant: Adobe Inc., San Jose, CA (US)

(72) Inventors: Viswanathan Swaminathan, Saratoga, CA (US); Teng Xu, Los Angeles, CA (US); Saayan Mitra, San Jose, CA (US)

(73) Assignee: ADOBE INC., San Jose, CA (US)

( * ) Notice: Subject to any disclaimer, the term of this patent is extended or adjusted under 35 U.S.C. 154(b) by 803 days.

(21) Appl. No.: 14/962,297

(22) Filed: Dec. 8, 2015

(65) Prior Publication Data
US 2017/0161618 A1 Jun. 8, 2017

(51) Int. Cl.
 G06N 5/04 (2006.01)
 G06F 16/23 (2019.01)
 G06F 16/48 (2019.01)
 G06Q 30/02 (2012.01)
 G06N 20/00 (2019.01)

(52) U.S. Cl.
 CPC .............. *G06N 5/04* (2013.01); *G06F 16/23* (2019.01); *G06F 16/48* (2019.01); *G06Q 30/02* (2013.01); *G06N 20/00* (2019.01)

(58) Field of Classification Search
 CPC ........ G06N 5/04; G06N 99/005; G06N 20/00; G06F 17/30345; G06F 17/30; G06F 16/23; G06F 16/48; H04N 21/466; H04N 21/25; G06Q 30/02
 See application file for complete search history.

(56) References Cited

U.S. PATENT DOCUMENTS

| 6,266,649 B1 * | 7/2001 | Linden | G06Q 10/08345 705/14.51 |
| 8,260,117 B1 * | 9/2012 | Xu | H04N 21/4668 386/239 |
| 2015/0149295 A1 * | 5/2015 | Braziunas | G06Q 30/0269 705/14.66 |

FOREIGN PATENT DOCUMENTS

| EP | 2 627 096 A1 | 8/2013 |
| WO | 20100766780 A1 | 7/2010 |

OTHER PUBLICATIONS

Debnath et al., "Feature Weighting in Context Based Recommendation System Using Social Network Analysis", Apr. 25-28, 2008, WWW, pp. 1041-1042.*

(Continued)

*Primary Examiner* — Kamran Afshar
*Assistant Examiner* — Brent Johnston Hoover
(74) *Attorney, Agent, or Firm* — Finch & Maloney PLLC

(57) ABSTRACT

Techniques are disclosed for automatically assigning weights to attributes of media content based in part on how many users actually viewed or listened to the content, as well as how many users "liked" or otherwise indicated a preference for the content. The content items can be any type of audio or visual media content, such as songs, videos, or movies, as well as written content, such as books, articles, journals, advertisements, or magazines. A first similarity score is determined based on a similarity between user preferences for content items. A second similarity score is determined based on a similarity between one or more common attributes of the content items. These attributes are assigned ratings that represent the number of users who consumed the corresponding content. Next, weights are assigned to each of the attributes based on the first and second similarity scores using, for example, linear equation regression techniques.

20 Claims, 4 Drawing Sheets

(56) References Cited

OTHER PUBLICATIONS

Debnath et al., "Feature Weighting in Context Based Recommendation System Using Social Network Analysis", Apr. 25-28, 2008, WWW, pp. 1041-1104 (Year: 2008).*
Aha, David W., "Feature Weighting For Lazy Learning Algorithms", Navy Center for Applied Research in Artificial Intelligence, 1998, 20 pgs.
Debnath, Souvik et al., "Feature Weighting in Content Based Recommendation System Using Social Network Analysis", WWW, 2008, pp. 1041-1042.
Spangler, W. Scott et al., "Feature Weighting in k-Means Clustering", Machine Learning, Aug. 2003, 21 pgs.
GB Search and Examination Report for related application No. GB1617816.2, dated Apr. 3, 2017, 4 pages.

* cited by examiner

US 10,460,247 B2

ATTRIBUTE WEIGHTING FOR MEDIA CONTENT-BASED RECOMMENDATION

FIELD OF THE DISCLOSURE

This disclosure relates generally to the field of data processing, and more particularly, to techniques for automatically assigning weights to attributes of media content items for generating content-based recommendations.

BACKGROUND

For a given body of media content, such as online videos, digital music, electronic books, news websites, and other digital media, a recommendation system can be used to provide suggestions that are tailored to the personal preferences and interests of a user. One type of recommendation is content-based recommendation, which is based on the similarity of various attributes of content items. These attributes may include, for example, "category," "genre," "actors," "artists," "description," and so forth. The similarity of content items can be computed by measuring a distance between attributes using, for example, a Jaccard index. Depending on the importance of these attributes to people, as measured by their indicated preferences for the associated content, different attributes can be assigned relative weights, which are used to calculate the similarity between two or more content items. However, current approaches to determining attribute weights suffer from a number of shortcomings that can adversely affect the quality and accuracy of content-based recommendations.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
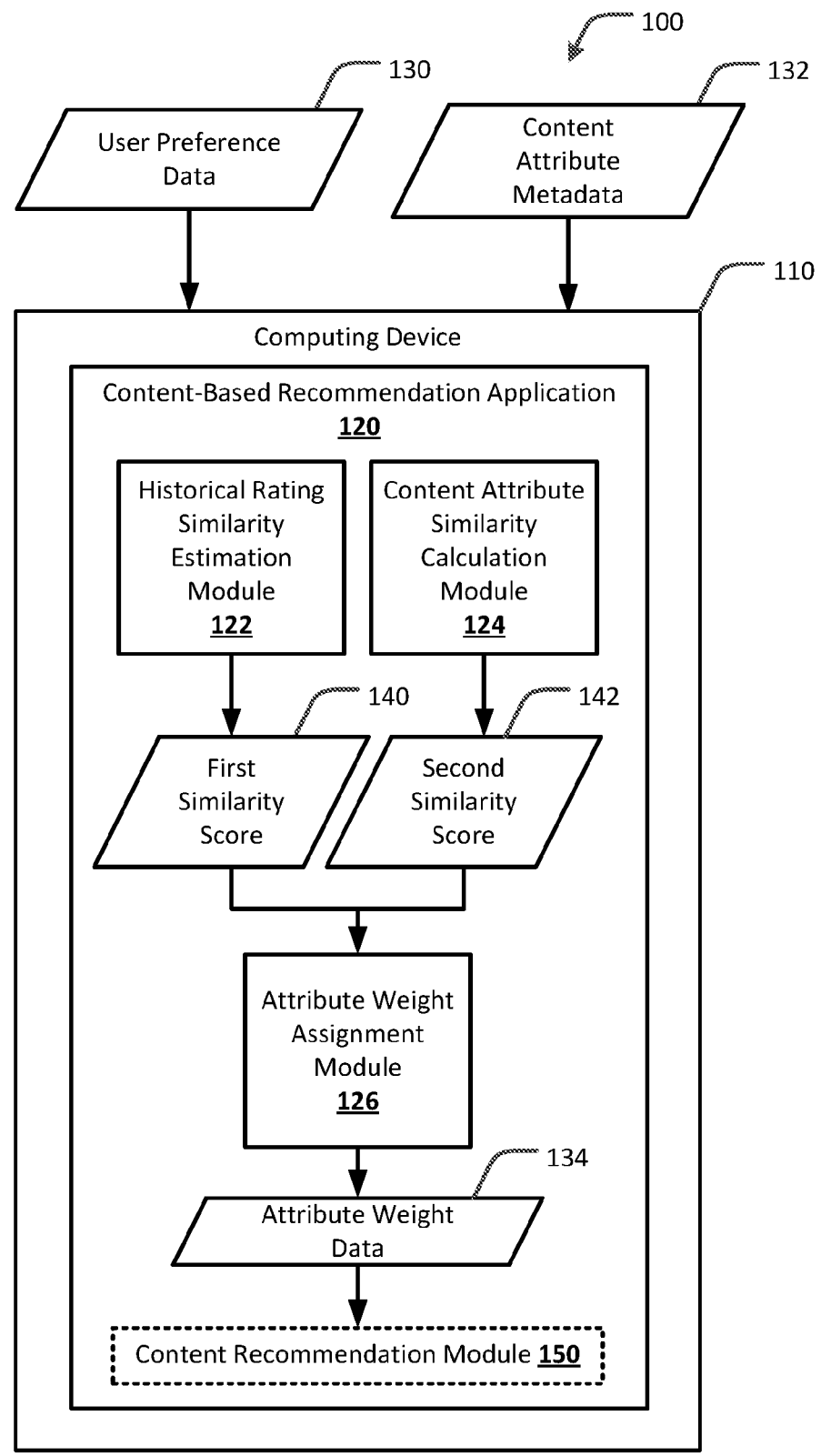
FIG. 1 shows an example content-based recommendation system, in accordance with an embodiment of the present disclosure.

As previously noted, existing content recommendation attribution weighting techniques suffer from a number of shortcomings that can adversely affect the quality and accuracy of content-based recommendations, particularly in the realm of digital media. For instance, existing attribute weighting techniques may suffer from a so-called popularity bias, in which content viewed or otherwise accessed by many people has a tendency to be judged similarly, whereas less popular content is penalized, even if the less popular content is similar to the more popular content. Such a popularity bias can have the effect of excluding the less popular content from the recommendations, despite similarities between attributes of the less popular content and the more popular content. As a result, the recommendations based on such existing attribute weighting techniques may direct users primarily toward the more popular content, which may, in turn, exacerbate the popularity bias problem.

In the domain of content-based recommendation, attribute weighting is a process of training a machine learning predictive model by assigning weights to different content attributes that form at least part of the predictive model. Machine learning algorithms are computerized pattern recognition techniques for generating predictive models that evolve and mature generally without explicit programming, and are useful in the field of content-based recommendation. Each content item can be represented by one or more attributes that characterize aspects of the content item, such as a title, artist, genre, description, television or motion picture rating, year of release, and so forth. Attribute weighting is a technique for improving the performance of such machine learning algorithms. The weighted attributes serve as a basis for determining statistical measures of similarity between content items, such that certain attributes have greater effect on the outcome of the predictive model than other attributes. The similarity measures in the predictive model can then form the basis of a ranked list of recommended items. However, the previously mentioned popularity bias associated with attribute weighting can occur when the machine learning algorithms are poorly trained. An example of a poorly trained machine learning algorithm is one in which the decision making is largely based on input samples that contain insufficient or misleading information. For instance, users may contribute to the weighting of various content attributes via social networks by so-called "liking" or otherwise indicating a preference for certain content items. Attributes associated with the preferred content items are then assigned weights generally proportional to the number of users who indicated their preference for the corresponding content items. For example, Movie A and Movie B are both highly popular, and a large number of users prefer both movies. Meanwhile, Movie C and Movie D are not very popular, and preferred by a small number of users, but most users who preferred Movie C also preferred Movie D. In this example, using existing content attribute weighting techniques, Movie A and Movie B will receive a high similarity score, while Movie C and Movie D will receive a low similarity score. However, the higher similarity score with respect to Movie A and Movie B results from the popularity of the movies, irrespective of how similar they are to each other (in reality, Movie A and Movie B could be quite different from one another, but because each movie is liked by a large number of users, the movies have a high similarity score even though a relatively small portion of the users like both of the movies). On the other hand, if Movie C and Movie D actually share similar attributes, existing content-based recommendation attribution weighting techniques underestimate the similarity between them because the movies are not popular. In other words, the similarity score suffers from a popularity bias because the associated machine learning algorithm was poorly trained using input samples that merely represent the overall number of user preferences for the content in general (the historical popularity), without the benefit of more specific information about those preferences. As a result, these existing techniques produce results that are misleadingly skewed by the bias caused by the significant difference in popularity between Movies AB and Movies C/D.

To this end, and in accordance with an embodiment of the present disclosure, techniques are disclosed for training a content-based recommendation predictive model by assigning weights to attributes of media content items in the predictive model based on two types of similarity scores, so as to provide a hybrid approach that leverages both attribute similarities and historical popularity of given media content items (e.g., songs, videos, books, and other forms of media). Such a hybrid approach mitigates the effect of the popularity bias in existing content recommendation attribution weighting techniques by basing the attribute weighting on a combination of the historical popularity, which remains a useful consideration, and the objective similarity between content attributes, such as "category," "genre," "actors," "artists," "description," and so forth. In particular, a predictive model, which includes weights assigned to various content attributes, can be trained by calculating at least two similarity scores for at least two content items, each of which are associated with one or more content attributes. The similarity scores are based on measures of similarity between user preferences for each of the content items (the historical similarity score), and between content attributes associated with each of the content items (the attribute similarity score). In the predictive model, weights can be automatically assigned to each of the content attributes based at least in part on the two similarity scores. Thus, in training the predictive model, the weights assigned to the content attributes are a function of both attribute similarity and historical popularity, rather than historical popularity alone, as in existing techniques. The predictive model uses the weighted attributes to generate a ranked list of content items having those attributes, the ranked list forming a content-based recommendation that can be presented to the user.

The historical similarity score can be calculated based on the user preferences for any number of content items. For instance, the content items can be any type of audio or visual media content, such as songs, videos, or movies, as well as printable content, such as books, articles, journals, magazines, advertisements, and the like. In some example cases, the user preferences are obtained from historical ratings data representing a number of users that indicate a preference for each content item. In such cases, the historical similarity score can be obtained, for example, by dividing the number of users that indicate a preference for all of the content items by the number of users that indicate a preference for any, but not necessarily all, of the content items.

The attribute similarity score is separately calculated based on a similarity between one or more common attributes of the content items. The common attributes may include, for example, a title, a genre, an actor or performer, or any other information that can be used to classify the content items in some manner. These attributes can be compared using, for example, a distance-based similarity metric, such as Cosine similarity or Pearson Correlation. Next, weights are assigned to each of the attributes based on the first and second similarity scores using, for example, linear equation regression techniques, such as will be described in further detail below. The resulting weighted attributes can then be used to generate content-based recommendations.

The various embodiments of this disclosure are differentiated from existing content recommendation attribution weighting techniques by the hybrid manner in which the similarity of content is calculated, which is then used to determine the weights assigned to each attribute. The weighted attributes can then be used to generate content-based recommendations by considering the full set of users who were engaged with the content, as opposed to the set users the set merely "liked" or otherwise indicated a preference the content. Additionally, content that has not been rated or watched by a large number of users is not penalized, which reduces the popularity bias present in the existing techniques. Furthermore, the same weight is used for a particular attribute across all content that has the same attribute, such as the actors attribute.

Embodiments of the present disclosure may provide significantly better results than existing content recommendation attribution weighting techniques that suffer from a popularity bias. Furthermore, the content recommendation attribution weighting obtained, using embodiments of the present disclosure, more accurately reflect the number of users who were engaged with the content (e.g., viewed or listened to the content), as opposed to existing techniques that use the number of users who merely indicated a preference for the content (e.g., by "liking" the content). For instance, by obtaining weights for individual attributes of the content that are based on user engagement, and by applying these weights across the entire content dataset, improved content recommendations can be provided to users. Numerous configurations and variations will be apparent in light of this disclosure.

Example System

FIG. 1 shows an example content-based recommendation system 100, in accordance with an embodiment of the present disclosure. The system 100 includes a computing device 110 configured to execute a content-based recommendation application 120. The content-based recommendation application 120 includes a historical rating similarity module 122, a content similarity calculation module 124, and an attribute weight assignment module 126. In some embodiments, the content-based recommendation application 120 further includes a content recommendation module 150. The content-based recommendation application 120 is configured to receive user preference data 130 and content attribute metadata 132, and to generate attribute weight data 134. The user preference data 130 includes historical rating information representing the number of users who indicated a preference for a media content item, or otherwise engaged with the content item, such as by viewing or listening to the content with a multimedia player or other suitable playback device. For example, the user preference data 130 may include the number of users who "liked" a video in a social media environment, or the number of users who viewed a video on a web site. The content attribute metadata 132 includes information about a media content item. For example, the content attribute metadata 132 for a given media content item may include data representing the genre associated with the item, an actor or performer associated with the item, and a description of the item, among other information that can be used to identify or classify the item.

The historical rating similarity estimation module 122 is configured to estimate, based on the user preference data 130, the similarity between two or more media content items based on the number of users who "liked" or otherwise indicated a preference for any of the media content items. The estimated historical rating similarity is represented by a first similarity score 140. As will be described in further detail below, the estimated historical rating similarity is a function of the number of users who preferred any of the content items being compared and the number of users who preferred all of the content items being compared. The content attribute similarity calculation module 124 is configured to calculate, based on the content attribute metadata 132, the similarity between two or more attributes that are common to two or more media content items. The calculated content attribute similarity is represented by a second similarity score 142. As will be described in further detail below, the calculated content attribute similarity is a function of a distance metric, such as a cosine similarity or a Pearson Correlation, applied to the content attributes, which are typically but not necessarily words.

The attribute weight assignment module 126 is configured to assign an attribute weight, represented by the attribute weight data 134, to each of the content attributes in a machine learning predictive model based on the first and second similarity scores 140, 142. As will be described in further detail below, the attribute weights are a function of the estimated historical rating similarity between two or more media content items and the calculated content attribute similarity between the content items. More particularly, for a given sample of p pairs of content items, p regression equations can be obtained for n+1 unknown weights for n attributes that are common to all of the content items. These equations can then be solved using multiple regression techniques to determine the unknown weights. In some embodiments, the content recommendation module 150 is configured to generate content-based recommendations for a given set of content items based on the attribute weight data 134 using the predictive model. For example, the content recommendation module 150 may suggest a particular content item to a user based on the statistical similarity of the item with one or more other content items having similar user preferences and attributes, weighted according to the predictive model.

Example Media Content Attributes

Figure 2:
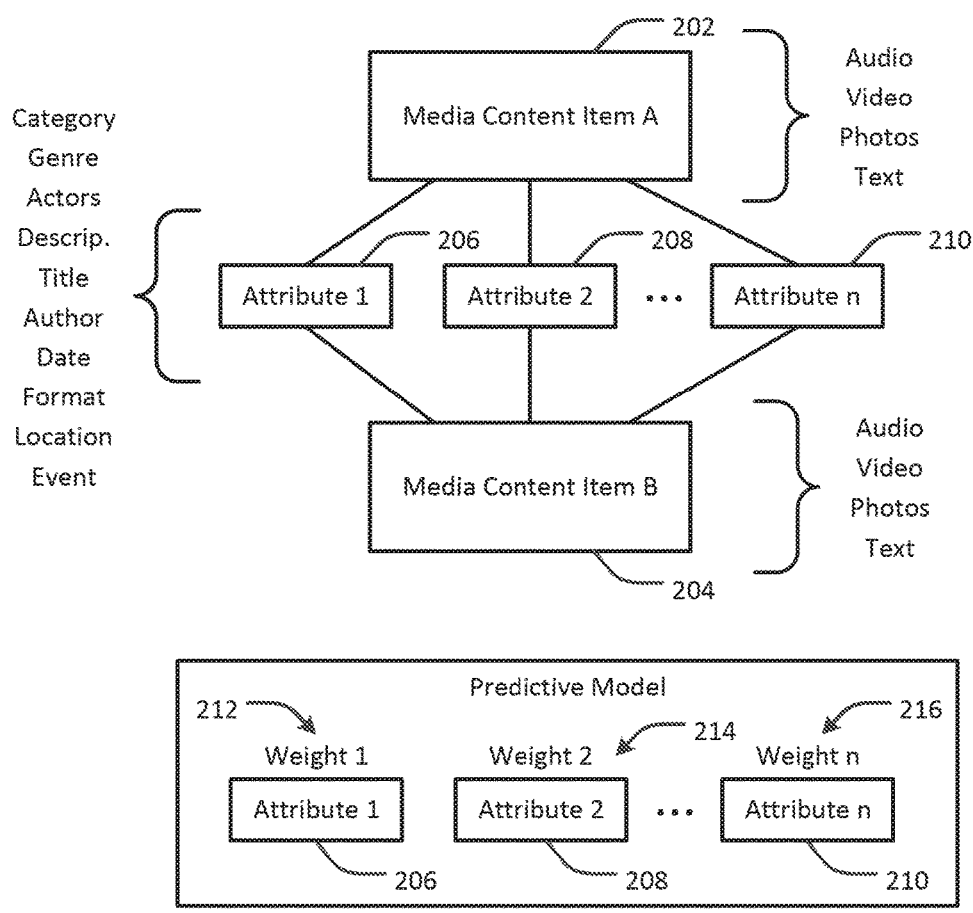
FIG. 2 is a graphical representation of common attributes associated with several media content items, in accordance with an embodiment of the present disclosure.

FIG. 2 is a graphical representation of common attributes associated with several media content items, in accordance with an embodiment of the present disclosure. In FIG. 2, the media content items are referenced as Media Content Item A 202 and Media Content Item B 204, although it will be understood that there can be any number of media content items. The media content items can be any form of media, such as audio, video, photographs, and text or other printable or readable matter (e.g., books, magazines, journals, brochures, etc.). Each of the media content items has one or more common attributes. For example, Media Content Item A 202 and Media Content Item B 204 may each have Attribute 1 206, Attribute 2 208, . . . Attribute n 210. An attribute is a characteristic that can be used to classify media content items. Attributes may, for example, be stored with a content item as metadata or stored separately in a database. These attributes can represent various types of information, such as category, genre, actors, description, title, author, date, format, location, event name, plot, writer, director, language, country, rating, votes, or any other information that can be used to characterize the media content items. For example, two media content items that are movies ("STAR WARS®" and "Raiders of the Lost Arc") may have several common attributes and attribute values, such as genre ("action"), actor ("Harrison Ford"), and description ("epic adventure"). It will be understood that common attributes do not need to have the same values. For example, two media content items that are TV shows ("STAR TREK®" and "Cosmos") may have several common attributes but different values, such as genre ("adventure" and "documentary", respectively), actor ("William Shatner" and "Carl Sagan", respectively), and description ("Captain James T. Kirk and the crew of the Starship Enterprise explore the Galaxy and defend the United Federation of Planets" and "Astronomer Carl Sagan leads us on an engaging guided tour of the various elements and cosmological theories of the universe", respectively). Each attribute 206, 208, 210 can be assigned a weight 212, 214, 216, which forms part of a machine learning predictive model for generating content-based recommendations of content items having similar attributes.

Example Content Attribute Weighting Methodology

Figure 3:
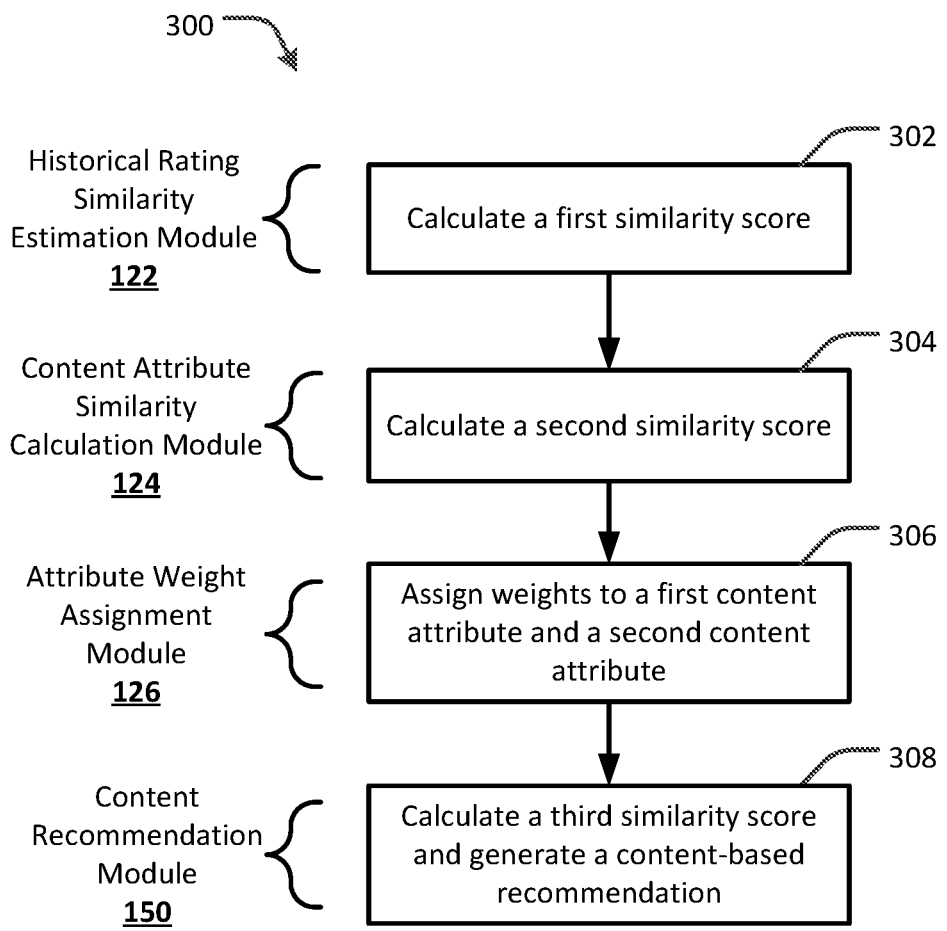
FIG. 3 is a flow diagram of an example content attribute weighting methodology, in accordance with an embodiment of the present disclosure.

FIG. 3 is a flow diagram of an example content attribute weighting methodology 300, in accordance with an embodiment of the present disclosure. The method 300 may, for example, be implemented by the computing device 110 of FIG. 1. According to an embodiment, a measure of the content-based similarity between two or more content items can be calculated as follows:

$$\text{sim}(A,B) = w_0 + w_1 f_1 + w_2 f_2(a_2, b_2) + \ldots + w_n f_n(a_n, b_n) + e \quad (1)$$

where A and B are two media content items, sim(A,B) is a similarity score, $w_i$ is an attribute weight, $f_i(a_i, b_i)$ is an attribute similarity function, and e is an error term.

In the above example, $f_1$ represents a measure of the similarity between the genres of A and B, $f_2$ represents a measure the similarity between actors in A and B, and $f_3$ measures the similarity between movie descriptions. The measures of similarity may include, for example, a Jaccard index or other statistic for comparing the similarity of information or data. It will be understood that $f_i$ can represent the similarity between any common attribute of A and B. The function $f_i$ depends on the chosen similarity metric for measuring the similarity between attributes, such as Cosine similarity, Pearson Correlation, etc. Different functions of $f_i$ should be normalized before being used to calculate sim(A,B) (e.g., all of the functions $f_i$ may be normalized to fall within a range of 0 to 1). In some embodiments, each attribute $a_i$ and $b_i$ of a content item can be regarded as a collection of words, thus a TF-IDF (term frequency-inverse document frequency) statistical value can be calculated based on the collection of words to generate a vector for the corresponding attribute. A TF-IDF is a numerical statistic used as a weighting factor in information retrieval that represents the relative importance of one word with respect to a collection of words, such as may be found in a content attribute. Therefore, in these cases, the measure of similarity for a given content item $f_i$ can be calculated using a cosine similarity between the TF-IDF vector of $a_i$ and the TF-IDF vector of $b_i$.

In an embodiment, an attribute weight can be calculated as follows. First, the similarity between two content items A and B is estimated using historical ratings of the items. The historical ratings may, for example, represent the number of people who "liked" the content item (such as in a social media context) or otherwise indicated a preference for the item (such as a star-based rating on a movie review website). In this case, the historical rating similarity can be calculated as follows:

$$\text{sim}(A,B) = (\text{number of users who liked both } A \text{ and } B)/(\text{number of users who liked either } A \text{ or } B) \quad (2)$$

For p pairs of content items, p regression equations can be obtained from Equation (2). Considering n attributes, as shown in Equation (1), there are n+1 unknown variables (e.g., n unknown weights and the intercept $w_0$) to be determined. These regression equations can then be solved using standard multiple regression techniques to determine the unknown weights $w_i$. In turn, a content-based similarity score can be obtained from equation (1) using the weights $w_i$.

Referring to FIG. 3, the method 300 begins by calculating 302 a first similarity score based on a measure of similarity between user preferences for each of a first content item and a second content item. The first content item and the second content item may, for example, include audio content, video content, printable content, or any other form of media content. In some embodiments, the measure of similarity between user preferences is based on historical rating data representing a number of users that indicate a preference for the first content item and a number of users that indicate a preference for the second content item. For instance, the first similarity score may be obtained from Equation (2) above using the user preference data 130 for the first and second content items. In some embodiments, applying Equation (2) results in calculating a number of users that indicate a preference for both the first and the second content items based on the historical rating data, and calculating a number of users that indicate a preference for either the first content item or the second content item based on the historical rating data, where the first similarity score is calculated by dividing the number of users that indicate a preference for both the first and the second content items by the number of users that indicate a preference for either the first content item or the second content item. In some embodiments, the calculating 302 may be performed by the historical rating similarity estimation module 122 of FIG. 1. It will be understood that the first similarity scores can be calculated for any number of content items. For example, in some embodiments the method 300 may include calculating 302 the first similarity score based further on a similarity between the first content item and a third content item, and a similarity between the second content item and the third media content item, in addition to the similarity between the first content item and the second content item.

The method 300 continues by calculating 304 a second similarity score based on a measure of similarity between a first content attribute and a second content attribute. For example, the second similarity score may be obtained from the function $f_i$ described above using the content attribute metadata 132 for the first and second content items. As with the first similarity score, it will be understood that the second similarity score can be calculated for any number of content items. The method 300 continues by training a machine learning predictive model by assigning 306 weights to each of the first content attribute and the second content attribute based on the first and second similarity scores. In some embodiments, calculating the weight includes generating a set of linear equations based on the first and second similarity scores, and applying a regression function to the set of linear equations to solve for the weight, where the weight is a factor in the set of linear equations, such as shown in Equation (1). The weights may, for example, form the attribute weight data 134. In some embodiments, the calculating 304 may be performed by the content attribute similarity calculation module 124 of FIG. 1.

In some embodiments, the method 300 further includes calculating 308 a third similarity score representing a measure of similarity between the first and second content items as a function of the weights and the second similarity score. For example, the third similarity score may be obtained from Equation (1) above using the attribute weight data 134. The third similarity score may then be used as the basis for generating a content-based recommendation. In some embodiments, the calculating 308 may be performed by the content recommendation module 150 of FIG. 1. In some embodiments, the method 300 may include generating, using the predictive model, content-based recommendations for a content item having both the first content attribute and the second content attribute based on the weights. For example, if Movie A, Movie C and Movie D all have the same attributes (e.g., genre, actor), where genre is more heavily weighted than actor, then the content-based recommendation may suggest Movie D (rather than Movie C) if the genre of Movie D is closer to the genre of Movie A then the genre of Movie C is to Movie A, assuming the actors are the same in all three movies. Other variations will be apparent in light of this disclosure.

The methodology 300 provides significantly better results than existing content attribute weighting techniques that suffer from a popularity bias at least because it considers the full set of users who were engaged with a media content item, as opposed to the set of users who merely indicated a preference for the content item, and also because less popular content is not penalized by the methodology since the same weight for a particular attribute is used for all content items. For example, the "actor" attribute will have a fixed weight for a given video dataset. The results can be, for example, about 28% better than with prior content attribute weighting techniques.

Example Computing Device

Figure 4:
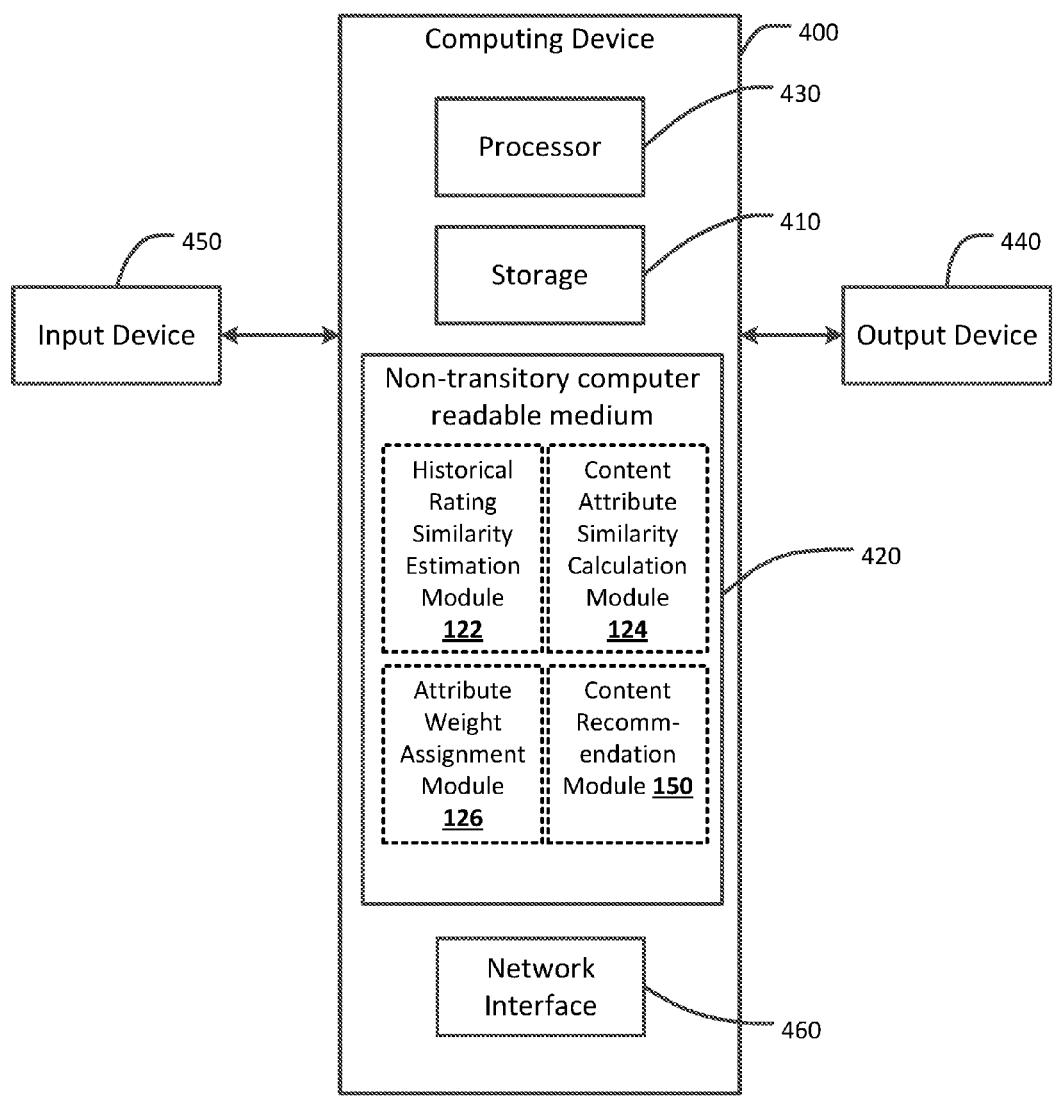
FIG. 4 is a block diagram representing an example computing device that may be used to perform any of the techniques as variously described in this disclosure.

FIG. 4 is a block diagram representing an example computing device 400 that may be used to perform any of the techniques as variously described in this disclosure. For example, the system 100 of FIG. 1, or any portions thereof, and the methodologies of FIG. 3, or any portions thereof, may be implemented in the computing device 400. The computing device 400 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 400 includes one or more storage devices 410 and/or non-transitory computer-readable media 420 having encoded thereon one or more computer-executable instructions or software for implementing techniques as variously described in this disclosure. The storage devices 410 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 410 may include other types of memory as well, or combinations thereof. The storage device 410 may be provided on the computing device 400 or provided separately or remotely from the computing device 400. The non-transitory computer-readable media 420 may include, but are not limited to, one or more types of hardware memory, non-transitory tangible media (for example, one or more magnetic storage disks, one or more optical disks, one or more USB flash drives), and the like. The non-transitory computer-readable media 420 included in the computing device 400 may store computer-readable and computer-executable instructions or software for implementing various embodiments. The computer-readable media 420 may be provided on the computing device 400 or provided separately or remotely from the computing device 400.

The computing device 400 also includes at least one processor 430 for executing computer-readable and computer-executable instructions or software stored in the storage device 410 and/or non-transitory computer-readable media 420 and other programs for controlling system hardware. Virtualization may be employed in the computing device 400 so that infrastructure and resources in the computing device 400 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 400 through an output device 440, such as a screen or monitor, which may display one or more user interfaces provided in accordance with some embodiments. The output device 440 may also display other aspects, elements and/or information or data associated with some embodiments. The computing device 400 may include other I/O devices 450 for receiving input from a user, for example, a keyboard, a joystick, a game controller, a pointing device (e.g., a mouse, a user's finger interfacing directly with a display device, etc.), or any suitable user interface. The computing device 400 may include other suitable conventional I/O peripherals, including, for example, a data communications network interface 460. The computing device 400 can include and/or be operatively coupled to various suitable devices for performing one or more of the aspects as variously described in this disclosure.

The computing device 400 may run any operating system, such as any of the versions of Microsoft® Windows® operating systems, the different releases of the UNIX® and LINUX® operating systems, any version of the MacOS® for Macintosh computers, any embedded operating system, any real-time operating system, any open source operating system, any proprietary operating system, any operating systems for mobile computing devices, or any other operating system capable of running on the computing device 400 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the content-based recommendation application 120, the historical rating similarity module 122, the content similarity calculation module 124, the attribute weight assignment module 126, the content recommendation module 150, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 400, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method for generating content-based recommendations. The method includes determining, by a computer processor, a first similarity score based on a statistical measure of similarity between user preferences for each of a first content item and a second content item; determining, by the computer processor, a second similarity score based on a statistical measure of similarity between a first content attribute and a second content attribute; training a predictive model by assigning, by the computer processor, a weight to the first content attribute based on the first and second similarity scores, and a weight to the second content attribute based on the first and second similarity scores; and generating, by the computer processor and using the predictive model, a content-based recommendation for a content item having both the first content attribute and the second content attribute based on the weights. In some cases, the statistical measure of similarity between user preferences is based on historical rating data representing a number of users that indicate a preference for the first content item and a number of users that indicate a preference for the second content item. In some such cases, the method includes calculating, by the computer processor, a number of users that indicate a preference for both the first and the second content items based on the historical rating data; and calculating, by the computer processor, a number of users that indicate a preference for either the first content item or the second content item based on the historical rating data, where the first similarity score is determined by dividing the number of users that indicate a preference for both the first and the second content items by the number of users that indicate a preference for either the first content item or the second content item. In some cases, determining the weight includes generating a set of linear equations based on the first and second similarity scores, and applying a regression function to the set of linear equations to solve for the weight, where the weight is a factor in the set of linear equations. In some cases, the method includes determining, by the computer processor, a third similarity score representing a statistical measure of similarity between the first and second content items as a function of the weights and the second similarity score. In some cases, the method includes determining, by the computer processor, the first similarity score based further on a statistical measure of similarity between the first content item and a third content item, and a statistical measure of similarity between the second content item and the third media content item. In some cases, the first content item and the second content item include digital audio content, digital video content, printable content, or any combination of these.

Another example embodiment provides a system having a storage and a computer processor operatively coupled to the storage. The computer processor is configured to execute instructions stored in the storage that when executed cause the computer processor to carry out a process. The process includes determining a first similarity score based on a statistical measure of similarity between user preferences for each of a first content item and a second content item; determining a second similarity score based on a statistical measure of similarity between a first content attribute and a second content attribute; and training a predictive model by assigning a weight to the first content attribute based on the first and second similarity scores, and a weight to the second content attribute based on the first and second similarity scores. In some cases, the statistical measure of similarity between user preferences is based on historical rating data representing a number of users that indicate a preference for the first content item and a number of users that indicate a preference for the second content item. In some such cases, the process includes calculating a number of users that indicate a preference for both the first and the second content items based on the historical rating data; and calculating a number of users that indicate a preference for either the first content item or the second content item based on the historical rating data, where the first similarity score is determined by dividing the number of users that indicate a preference for both the first and the second content items by the number of users that indicate a preference for either the first content item or the second content item. In some cases, assigning the weight includes generating a set of linear equations based on the first and second similarity scores, and applying a regression function to the set of linear equations to solve for the weight, where the weight is a factor in the set of linear equations. In some cases, the process includes determining a third similarity score representing a statistical measure of similarity between the first and second content items as a function of the weights and the second similarity score. In some cases, the process includes determining the first similarity score based further on a statistical measure of similarity between the first content item and a third content item, and a similarity between the second content item and the third media content item. In some cases, the first content item and the second content item include digital audio content, digital video content, printable content, or any combination of these. Another example embodiment provides a non-transient computer program product having instructions encoded thereon that when executed by one or more processors cause a process to be carried out for performing one or more of the aspects variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for generating content-based recommendations, the method comprising:
   determining, by a computer processor, a first similarity score based on a statistical measure of similarity between user preferences for each of a first content item and a second content item;
   determining, by the computer processor, a second similarity score based on a statistical measure of similarity between a first content attribute and a second content attribute;
   training a predictive model by assigning, by the computer processor, a weight to the first content attribute based on the first and second similarity scores, and a weight to the second content attribute based on the first and second similarity scores, wherein the same weight is assigned to a plurality of content items each having the same content attribute; and
   generating, by the computer processor and using the predictive model, a content-based recommendation for at least one of the plurality of content items having both the first content attribute and the second content attribute based on the weights.

2. The method of claim 1, wherein the statistical measure of similarity between user preferences is based on historical rating data representing a number of users that indicate a preference for the first content item and a number of users that indicate a preference for the second content item.

3. The method of claim 2, further comprising:
   calculating, by the computer processor, a number of users that indicate a preference for both the first and the second content items based on the historical rating data; and
   calculating, by the computer processor, a number of users that indicate a preference for either the first content item or the second content item based on the historical rating data,
   wherein the first similarity score is determined by dividing the number of users that indicate a preference for both the first and the second content items by the number of users that indicate a preference for either the first content item or the second content item.

4. The method of claim 1, wherein assigning the weight comprises generating a set of linear equations based on the first and second similarity scores, and applying a regression function to the set of linear equations to solve for the weight, wherein the weight is a factor in the set of linear equations.

5. The method of claim 1, further comprising determining, by the computer processor, a third similarity score representing a statistical measure of similarity between the first and second content items as a function of the weights and the second similarity score.

6. The method of claim 1, further comprising determining, by the computer processor, the first similarity score based further on a statistical measure of similarity between each of:
   the first content item and a third content item, and
   the second content item and the third media content item.

7. The method of claim 1, wherein each of the first content item and the second content item are at least one of digital audio content, digital video content, and printable content.

8. In an information processing environment, a system comprising:
   a storage; and
   a computer processor operatively coupled to the storage, the computer processor configured to execute instructions stored in the storage that when executed cause the computer processor to carry out a process comprising:
      determining a first similarity score based on a statistical measure of similarity between user preferences for each of a first content item and a second content item;
      determining a second similarity score based on a statistical measure of similarity between a first content attribute and a second content attribute;
      training a predictive model by assigning a weight to the first content attribute based on the first and second similarity scores, and a weight to the second content attribute based on the first and second similarity scores, wherein the same weight is assigned to a plurality of content items each having the same content attribute; and generating, using the predictive model, a content-based recommendation for at least one of the plurality of content items having both the first content attribute and the second content attribute based on the weights.

9. The system of claim 8, wherein the statistical measure of similarity between user preferences is based on historical rating data representing a number of users that indicate a preference for the first content item and a number of users that indicate a preference for the second content item.

10. The system of claim 9, wherein the process further comprises:
   calculating a number of users that indicate a preference for both the first and the second content items based on the historical rating data; and
   calculating a number of users that indicate a preference for either the first content item or the second content item based on the historical rating data,
   wherein the first similarity score is determined by dividing the number of users that indicate a preference for both the first and the second content items by the number of users that indicate a preference for either the first content item or the second content item.

11. The system of claim 8, wherein assigning the weight comprises generating a set of linear equations based on the first and second similarity scores, and applying a regression function to the set of linear equations to solve for the weight, wherein the weight is a factor in the set of linear equations.

12. The system of claim 8, wherein the process further comprises determining a third similarity score representing a statistical measure of similarity between the first and second content items as a function of the weights and the second similarity score.

13. The system of claim 8, wherein the process further comprises determining the first similarity score based further on a statistical measure of similarity between each of:
   the first content item and a third content item, and
   the second content item and the third media content item.

14. The system of claim 8, wherein each of the first content item and the second content item are at least one of digital audio content, digital video content, and printable content.

15. A non-transitory computer program product having instructions encoded thereon that when executed by one or more computer processors cause the one or more computer processors to perform a process comprising:
   determining a first similarity score based on a statistical measure of similarity between user preferences for each of a first content item and a second content item;
   determining a second similarity score based on a statistical measure of similarity between a first content attribute and a second content attribute;
   training a predictive model by assigning a weight to the first content attribute based on the first and second similarity scores, and a weight to the second content attribute based on the first and second similarity scores, wherein the same weight is assigned to a plurality of content items each having the same content attribute; and
   generating, using the predictive model, a content-based recommendation for at least one of the plurality of content items having both the first content attribute and the second content attribute based on the weights.

16. The non-transitory computer program product of claim 15, wherein the statistical measure of similarity between user preferences is based on historical rating data representing a number of users that indicate a preference for the first content item and a number of users that indicate a preference for the second content item.

17. The non-transitory computer program product of claim 16, wherein the process further comprises:
   calculating a number of users that indicate a preference for both the first and the second content items based on the historical rating data; and
   calculating a number of users that indicate a preference for either the first content item or the second content item based on the historical rating data,
   wherein the first similarity score is determined by dividing the number of users that indicate a preference for both the first and the second content items by the number of users that indicate a preference for either the first content item or the second content item.

18. The non-transitory computer program product of claim 15, wherein assigning the weight comprises generating a set of linear equations based on the first and second similarity scores, and applying a regression function to the set of linear equations to solve for the weight, wherein the weight is a factor in the set of linear equations.

19. The non-transitory computer program product of claim 15, wherein the process further comprises determining a third similarity score representing a statistical measure of similarity between the first and second content items as a function of the weights and the second similarity score.

20. The non-transitory computer program product of claim 15, wherein the process further comprises calculating the first similarity score based further on a similarity between each of:
   the first content item and a third content item, and
   the second content item and the third media content item.

* * * * *